United States Patent [19]
Carver

[11] Patent Number: 5,699,156
[45] Date of Patent: Dec. 16, 1997

[54] SPECTROPHOTOMETER APPARATUS WITH DUAL LIGHT SOURCES AND OPTICAL PATHS, FIBER OPTIC PICK-UP AND SAMPLE CELL THEREFOR

[76] Inventor: David R. Carver, 4540 S. Navajo, #1, Englewood, Colo. 80110

[21] Appl. No.: 344,209

[22] Filed: Nov. 23, 1994

[51] Int. Cl.⁶ .................... G01J 3/06; G01J 3/10
[52] U.S. Cl. .................... 356/319; 356/332; 356/411
[58] Field of Search .................... 356/319, 326, 356/328, 332, 333, 411

[56] References Cited

U.S. PATENT DOCUMENTS

| | | | |
|---|---|---|---|
| 3,437,411 | 4/1969 | Rudomanski. | |
| 3,614,242 | 10/1971 | Hrdina | 356/246 X |
| 3,885,879 | 5/1975 | Louder et al. . | |
| 4,014,612 | 3/1977 | Atwood et al. | 356/325 |
| 4,125,329 | 11/1978 | French et al. | 356/405 |
| 4,396,288 | 8/1983 | Helphrey | 356/326 |
| 4,545,680 | 10/1985 | Smith, Jr. | 356/319 |
| 4,566,792 | 1/1986 | Suzuki | 356/319 |
| 5,042,893 | 8/1991 | Ong | 356/328 X |
| 5,153,679 | 10/1992 | Gilby | 356/440 |
| 5,184,193 | 2/1993 | LeFebre | 356/325 |
| 5,212,537 | 5/1993 | Birang et al. | 356/319 X |

FOREIGN PATENT DOCUMENTS

| | | | |
|---|---|---|---|
| 46-23651 | 7/1971 | Japan | 356/333 |

OTHER PUBLICATIONS

Excerpt from Optical Coating Laboratory, Inc., 1990–1991 Catalog.
"Have You Considered Using Variable Band Pass Filters?" *Laser Focus World*, Sep., 1989.

*Primary Examiner*—Vincent P. McGraw
*Attorney, Agent, or Firm*—Timothy J. Martin; Michael R. Henson

[57] ABSTRACT

A spectrophotometer employs an array of optical elements to focus light from at least one, but preferably two light sources onto a fiber optic beam splitter that provides a pickup for a selected bandwidth of wavelengths of light in the spectral pattern. The spectral pattern can include wavelengths in the visible, near infrared and ultraviolet spectrum. To create the spectral pattern, two reflecting prisms having spherical surfaces are used, and the optical elements are arranged so that the two spectral bands from each prism are longitudinally aligned to create the spectral pattern. The prisms are on a motor driven pivot mount so that the spectral pattern may be swept across the pickup. The optical elements and the pickup are sized so that the selected bandwidth is less than twenty nanometers over the spectral pattern. The pickup is formed by a single row of the ends of fiber optic strands which are then collimated into two bundles to transmit a test component and a reference component of light. The sample cell is somewhat elongated, and a lens is interposed in the test component path before the sample cell, and this lens is sized to focus light axially through the sample cell without impinging on the sidewalls. Photodiode detectors, comparator circuitry and a controller are included.

13 Claims, 5 Drawing Sheets

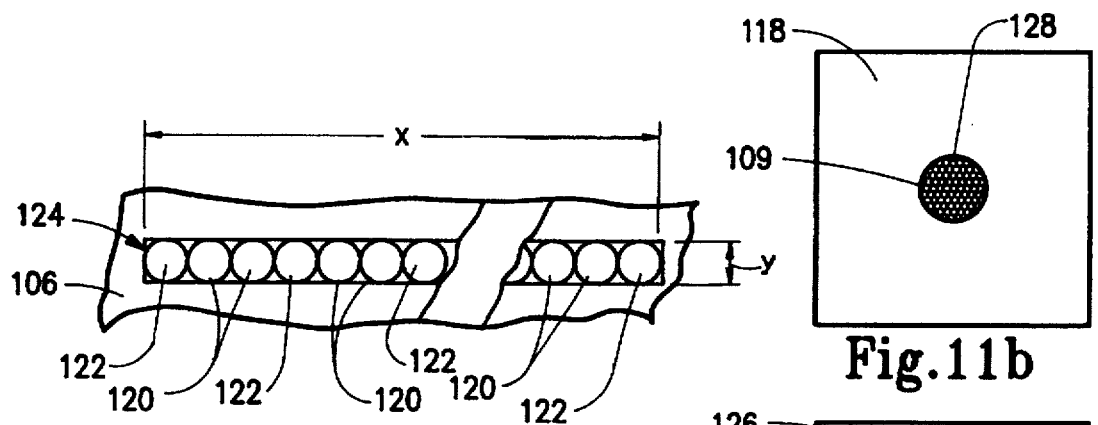
Fig.10
Fig.11b
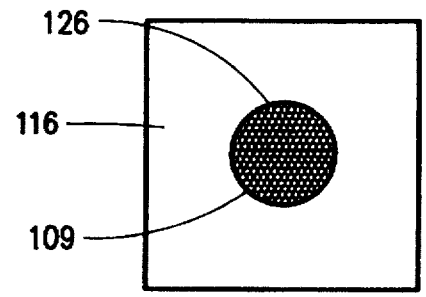
Fig.11a
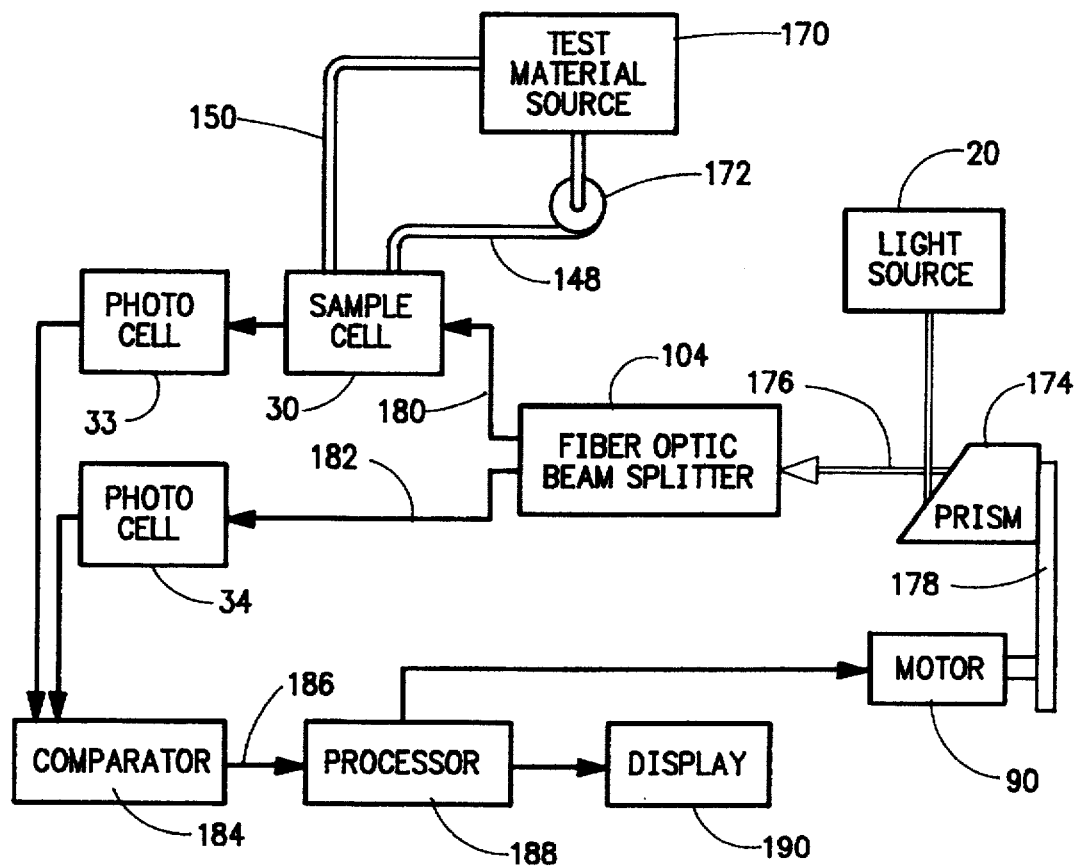
Fig.15

SPECTROPHOTOMETER APPARATUS WITH DUAL LIGHT SOURCES AND OPTICAL PATHS, FIBER OPTIC PICK-UP AND SAMPLE CELL THEREFOR

FIELD OF THE INVENTION

The present invention relates to an apparatus for measuring the optical absorbance properties of a sample material. In particular, the present invention is directed to measuring absorbance of light by a sample material as an analytic tool, such as used in liquid chromatography. Specifically, this invention is concerned with measuring optical absorbance over different wavelengths of light over a wide spectrum, including ultraviolet light as well as the visible and near infrared.

BACKGROUND OF THE INVENTION

Liquid chromatography has been a steadily growing technology for analytical chemists, and it is generally considered one of the most powerful analytical tools available due to its ability to separate, and thereby differentiate, compounds having minor stoichiometric or isomeric properties. In the field of liquid chromatography, one of the most useful instruments employed to identify sample materials is the spectrophotometer, known also as photometric absorbance monitors and/or LC detectors. Spectrophotometers help identify compounds by measuring the sample material's absorbance of light at different wavelengths. By measuring absorbance characteristics over a spectrum of wavelengths, the analyst can create a "fingerprint" of the sample material which may then be used to identify and/or characterize the material.

In order to accurately resolve a test sample's "fingerprint", a spectrophotometer must incorporate excellent optics and electronics design. Furthermore, it is desirable to have a spectrophotometer that can produce and monitor spectral absorbance over a wide range of wavelengths and include within that range a substantial portion in the ultraviolet spectrum. Moreover, it is desirable to measure absorbance at relatively narrow bandwidths selected over the wide spectral band. Also, it is desirable that such a spectrophotometer incorporate optics designed to minimize events which may inject error into the absorption measurement.

Prior absorption detectors in the field of liquid chromatography have typically either utilized a light source having a defined wavelength emission or, more preferably, a light source which emits radiation over a wavelength range. The light is then dispersed by means of a grating into separate wavelength bands, and these bands are then selectively passed through the sample cell containing the material to be tested. Prior to passing a light beam through the sample cell, a portion of the beam is split to provide a reference to the intensity of the original beam so that this reference may be compared with the beam transmitted through the sample cell to determine the absorption of the selected wavelength of the beam. A discussion of such a detector is described in an article entitled "Design of an LC Detector: Part I", *American Laboratory* (May 1987) co-authored by the present applicant.

In other devices, filters may be used to select a wavelength at which an absorption test is made. An example of such a device is described in my co-pending U.S. application, Ser. No. 08/093,065 filed Jul. 16, 1993 and entitled "Apparatus for Measuring Optical Absorption Properties of a Sample Material". U.S. Pat. No. 3,885,879 issued May 27, 1975 to Louder et al employs a dual beam spectrophotometer utilizing a movable spectral wedge to select a wavelength at which a test is made. The Louder et al reference also employs a bifurcated fiber optic bundle which defines a pickup for the test and reference wavelength band as well as a means for splitting the selected bandwidth between the sample cell and a reference. A disadvantage of the design of existing spectrophotometers resides in the interaction of the optics with the physical properties of the sample cell. Typically, light is passed through the sample cell in such a manner that it impinges and reflects off of the cell walls before being sensed by the photodetector. Since test materials are typically dissolved in a carrier medium, the physical characteristics attendant the interface between the contact liquid layer and the cell sidewall alters the absorption properties of the cell sidewall so that error is introduced into the intensity measurement. That is, not all absorbance detected results from absorption of light by the test material. This can give a false profile or "fingerprint" of the test material and lead to either incorrect or inconclusive results.

Another disadvantage many detectors have is that the spectral gratings are typically optical elements having sufficient mass so that the inertia at present during motion presents difficult mechanical drive problems. That is, it is difficult to start and stop the relatively heavy dispersion elements at each of the selected wavelength bands which can effect the resolution of the instrument.

Accordingly, there is a need for improved spectrophotometer design which has high resolution and which reduces the risk of introducing error into the test measurements. It is desirable that such spectrophotometers accurately and precisely measure optical absorption over a relatively narrow bandwidth while at the same time being selectable over a wide range of available wavelengths within the spectrum over which the test is conducted. Moreover, there is a need for such spectrophotometers to be able to measure both in the visible, near infrared and ultraviolet wavelength ranges. These needs are especially prevalent due to the rapid expansion for the technology of liquid chromatography especially for the chemist and biochemist.

SUMMARY OF THE INVENTION

It is an object of the present invention to provide a new and useful apparatus for measuring optical absorbance properties of a sample material in a sample cell.

Another object of the present invention is to provide a spectrophotometer having improved optical design which is relatively easy and cheap to manufacture.

Another object of the present invention is to provide spectrophotometer having optical elements designed so as to minimize the risk of introducing error when measuring optical absorbance of a material located in a sample cell.

Still a further object of the present invention is to provide a spectrophotometer which measures spectral absorbance over a relatively narrow bandwidth within a spectrum having a wide range of available wavelengths, including wavelengths in both the visible, near infrared and ultraviolet spectrum.

To accomplish these objects, the spectrophotometer according to the present invention broadly includes a light source which is operative to produce light over a selected wavelength spectrum. An array of optical elements operate to receive a portion of the light from the light source and to disburse that portion as a spectral pattern having a transverse width varying in wavelength along a longitudinal length. A fiber optic beam splitter provides a pickup for a bandwidth within the wavelength spectrum by having first ends disposed in a row positioned transversely relative to the spectral pattern. The fiber optic strands are then separated into first and second collimated bundles each terminating at second ends opposite the pickup, with the second ends being arranged to have a circular cross-section. A first collimated bundle therefor transmits a test component of light from the pickup and the second collimated bundle transmits a reference component of light.

A sample cell is then disposed such that the test component of light will be transmitted therethrough and through any test material placed therein. A first detector measures the intensity of light of the test component after passing through the sample cell, and a second detector measures the intensity of light of the referenced component. The outputs of the first and second detectors may then be compared by a signal comparator thereby to correlate an amount of light absorbed by the sample material at the selected wavelength. The pickup and the spectral pattern are relatively movable with respect to one another thereby to allow selection of a wide range of test bandwidths within the spectral pattern.

In its more detailed construction, the present invention includes a housing adapted to receive and support the various optical elements. Here, a support block is secured in the interior of the housing and is located proximate to a first end. A mounting plate is pivotally connected to the mounting block for reciprocal pivotal motion relative thereto about a pivot axis, and first and second reflecting prisms are secured to the mounting plate so that they face at opposite end of the housing. First and second light sources produce light over first and second spectra, respectively, and first and second apertures are located proximately to the support block, on each side thereof, to define point sources for light from the first and second light sources. First and second concave mirrors are disposed in the housing in facing relationship, respectively, to the first and second apertures with the apertures being located at the respective focal lengths of the first and second mirrors. The two mirrors act to reflect light from the apertures onto the first and second prisms. The two prisms then disperse the light into first and second spectral bands of varying wavelengths in a longitudinal direction. The first and second prisms are each formed by a pair of spherical surfaces canted at an angle with respect to one another. The prisms are also oriented such that the spectral bands from each are longitudinally aligned with one another as a spectral pattern. A mechanical drive in the form of a motor is linked to the mounting plate and is operative to reciprocally pivot the mounting plate and thereby the first and second reflecting prisms. This causes the spectral pattern to be longitudinally swept across the pickup.

Preferably, the pickup is in the form of a single row so that the pickup as a width measured diametrically across one of the first ends of the fiber optic strands and a length that is equal to the combined diameters of all the optic strands arranged in the single row. The fiber optic strands are preferably on hundred microns in diameter, and pickup is positioned at or near the focal length of the reflecting prisms. The curvature of the prisms' surfaces are selected so that the longitudinal length of the spectral pattern is sufficient so that bandwidth of selected light is less than twenty nanometers, preferably about five to ten nanometers on the average. Further, it is preferred that the first ends of each of the first and second fiber optic bundles be uniformly dispersed across the pickup. Here, also, it is preferred that the number of fiber optic strands used to pickup the test component of light, that is, those strands in the first bundle, be greater in number that the fiber optic strands used to pickup the reference component, that is, in the second bundle. For example, where the number of strands in the first bundle at twice the number of strands in the second bundle, every third end in the pickup is used for the reference (second) bundle with there being two ends therebetween used for the test (first) bundle.

The sample cell is preferably formed as a chamber having a central axis, a surrounding sidewall and a pair of axially opposed windows. The test component is then passed axially therethrough in a direction from the first window to the second window. The second ends of the first bundle are then collimated and are axially aligned with the central axis of the chamber, and a lens is interposed between the second ends of the first bundle and the first window with this lens being constructed to focus the test component of light so that the test component of light does not significantly impinge on the surrounding sidewall of the chamber as the test component of light passes through the sample cell. A similar lens is used to focus the reference beam. The sample cell may include a fluid inlet and a fluid outlet each in communication with the chamber so that a fluid test sample may flow through the chamber during the test. The first and second detectors may be simple photocells which provide signals to the comparator. A controller may be employed to monitor the comparator and display the optical absorbance data. This display, for example, can be a graph printer. The controller may also control the motor to sequentially select the test wavelengths at a desired bandwidth within the spectral pattern.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 10 is an enlarged in view in elevation of the first ends of the fiber optic strands shown in FIG. 9 forming the pickup used in the spectrophotometer of the present invention;

FIGS. 11(a) and 11(b) are end views in elevation showing the collimated second end portions of the fiber optic strands of FIG. 9;

FIG. 15 is a diagrammatic view showing the interaction of the various components forming the spectrophotometer according to the exemplary embodiment of the present invention.

DETAILED DESCRIPTION OF THE EXEMPLARY EMBODIMENT

The present invention is directed to a spectrophotometer which is used as an analytical tool, especially for such applications as liquid chromatography. The spectrophotometer operates to measure the optical absorption of a sample or test material at various wavelengths as selected over a relatively wide spectral band. As described below the spectral band preferably includes wavelengths in both the visible, near infrared and ultraviolet spectra, and measurements may be made at great variety of narrow band widths within this overall spectral pattern. The present invention is designed to have simple and precise optical elements incorporating a fiber optic beam splitter as well as focusing elements which reduce the risk of introducing inaccuracies into the measured absorbance.

Figure 1:
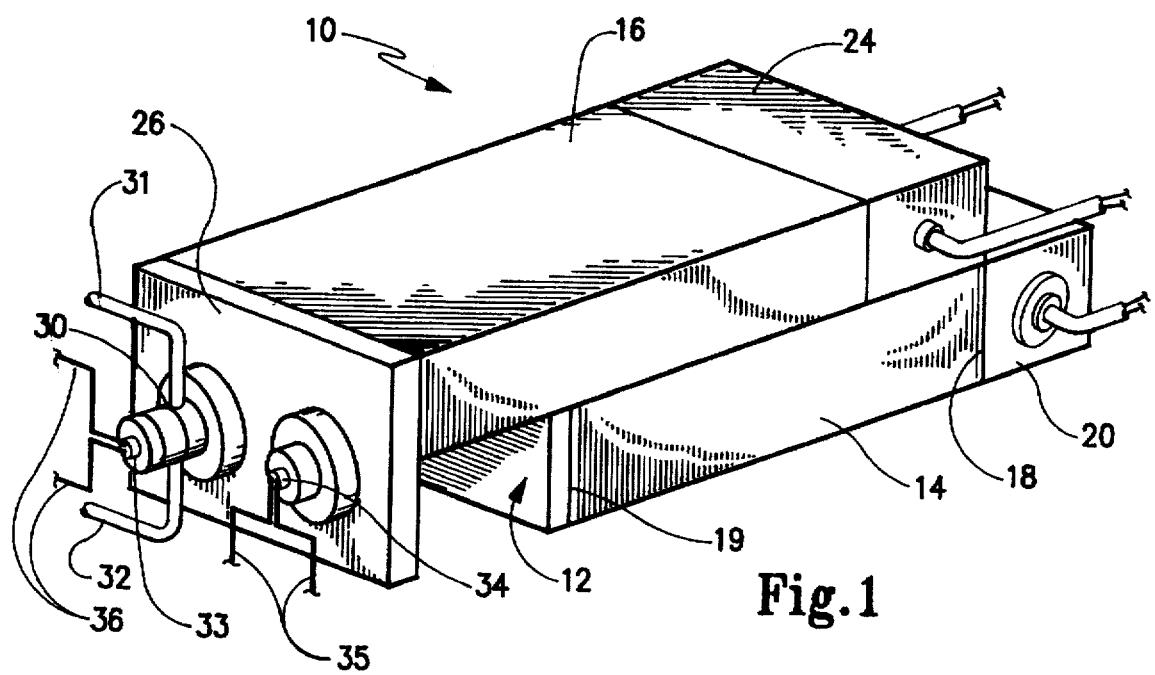
FIG. 1 is a perspective view of the housing and optics of the spectrophotometer according to the exemplary embodiment of the present invention.
Figure 3:
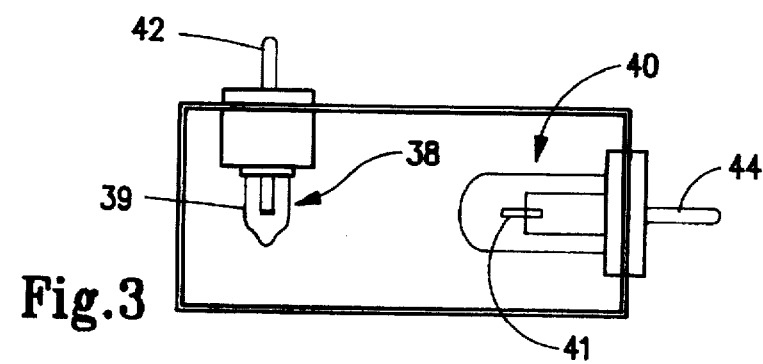
FIG. 3 is a cross-sectional view taken about lines 3—3 of FIG. 2.

With reference to FIGS. 1 and 3, it may be seen that the spectrophotometer 10 according to the exemplary embodiment of the present invention includes a housing 12 having a lower section 14 and an upper section 16 which are slightly offset relative to one another. A dual light source 20 is disposed at a first end 18 of lower section 14 of housing 12 and an end plate 22 shown in FIG. 4 encloses a second end 19 of lower section 14. A motor assembly 24 is disposed on housing 12 at the first end near to light source 20, as is shown in FIG. 1, and a second end plate 26 encloses second end 19' of housing 12, at upper section 16. As described more thoroughly below, second end plate 26 supports a sample cell 30 as well as its photodetector 33, and a photodetector 34 is also supported on second end plate 26. Wire connects 35 and 36 are provided for photocells 33 and 34.

Figure 2:
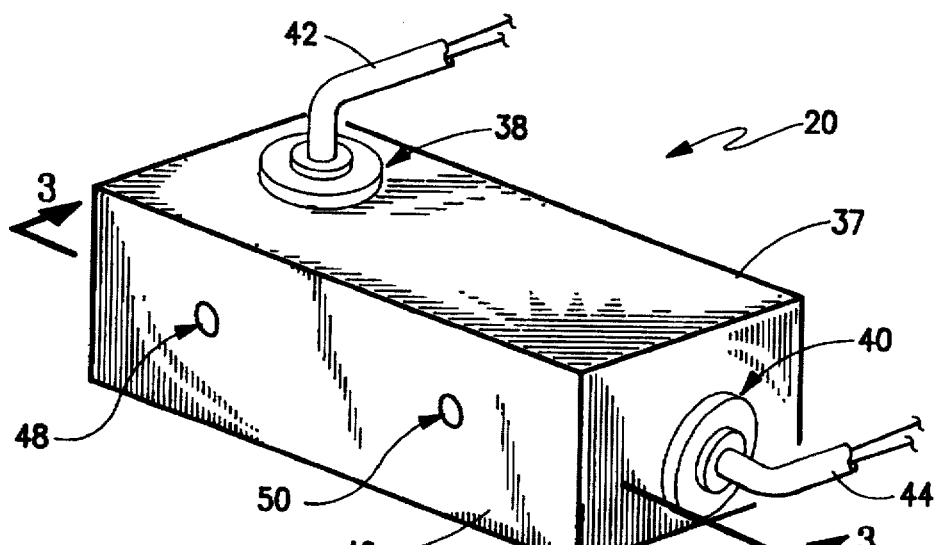
FIG. 2 is a perspective view of the dual light source used in the spectrophotometer shown in FIG. 1.

Dual light source 20 is best shown in FIGS. 2 and 3 where it may be seen that light source 20 has a separate housing 37 which mounts a first light source 38 and second light source 40 which each produce light over different wavelength spectra. For example, first light source 38 is preferably a tungsten filament lamp operative to produce light over a visible spectrum, while second light source 40 is preferably a deuterium lamp operative to produce over an ultraviolet spectrum. First and second light sources 38, 40 are respectively powered over wire cables 42, 44 by a power source (not shown). The filament 39 and the arc 41 of the tungsten and deuterium lamps are positioned transversely to the length of the housing as is shown in FIG. 3. Aperture plate 46 encloses light source housing 36 and is provided with a first aperture 48 that forms a point source of light from first light source 38 and a second aperture 50 that provides a point source for second light source 40.

Figure 4:
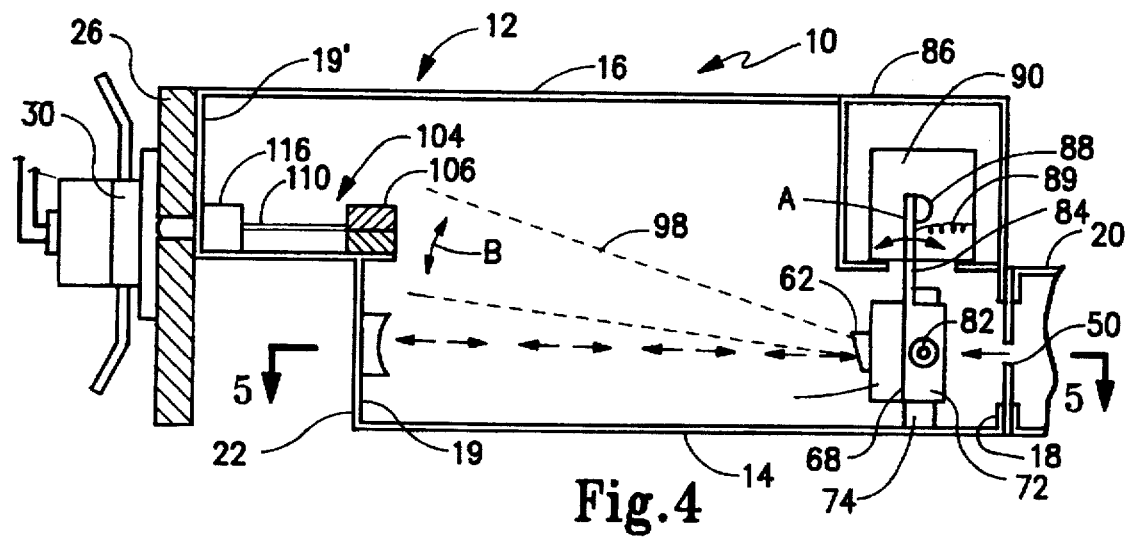
FIG. 4 is a side view in partial cross-section of the spectrophotometer shown in FIG. 1.
Figure 5:
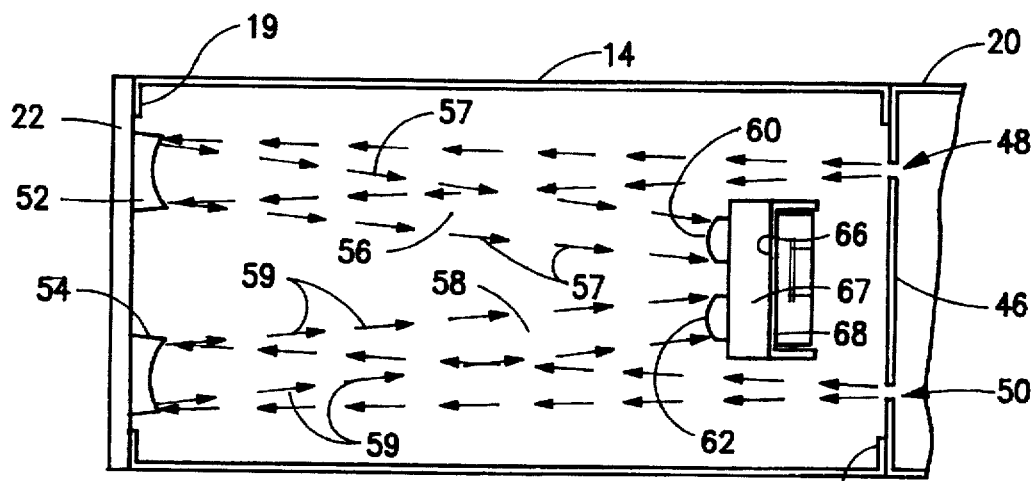
FIG. 5 is a cross-section view taken about lines 5—5 of FIG. 4.
Figure 9:
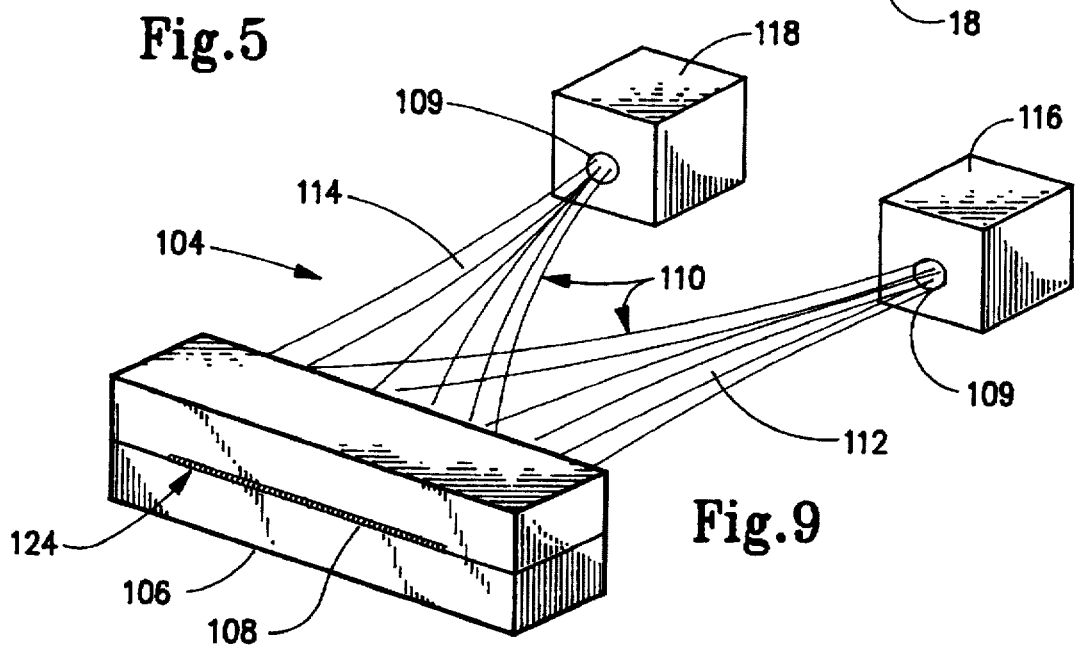
FIG. 9 is a perspective view of the fiber optic beam splitter used in the spectrophotometer of the present invention.

As is shown in FIG. 1, but better shown in FIGS. 4 and 5, light source 20 is mounted onto first end 18 of housing 12 on lower section 14. First and second concave mirrors 52 and 54 are secured to end plate 22 in facing relationship to apertures 48 and 50, respectively. The focal length of each of mirrors 52 and 54 are selected so that apertures 48 and 50, respectively, are located at respective focal points thereof. Diverging light from aperture 48 is then collimated into a first beam 56 designated by arrows 57 (FIG. 5). Likewise, diverging light from aperture 50 is collimated into a second beam 58 as indicated by arrows 59. Mirrors 52 and 54 are oriented so that they respectively direct their collimated beams 56, 58 onto first and second dispersing prisms 60 and 62, respectively.

Figure 6:
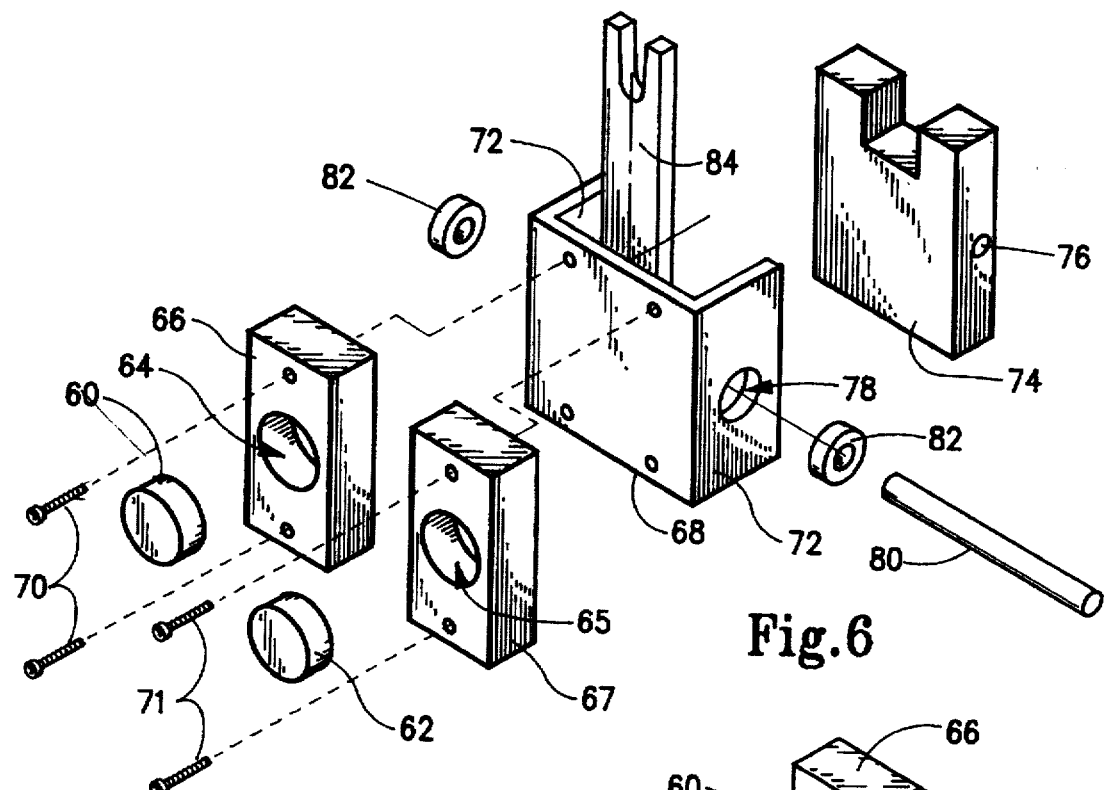
FIG. 6 is an exploded perspective view of the mounting structure for the dispersing prisms used in the spectrophotometer of FIG. 1.

With reference again to FIGS. 4 and 5, but with special reference to FIG. 6, it may be seen that first prism 60 may be seated in cavity 64 formed in a mounting block 66 that in turn is secured to a mounting plate 68 by screws, such as screws 70. Likewise, second prism 62 is seated in a cavity 65 formed in mounting block 67. Mounting block 67 is also secured to mounting plate 68 by means of screws 71. Mounting plate 68 includes a pair of opposed wings 72 and is secured to a mounting block 74 which is received between wings 72. Here, mounting block 74 is provided with a bore 76, and wings 72 are provided with aligned holes, such as hole 78 such that, when mounting block 74 is positioned between wing 72, an axle pin 80 may extend through holes 78 and bore 76 to pivotally secure mounting plate 68 to mounting block 74. To this end, also, bearings 82 are provided to facilitate pivotal motion.

Turning again to FIGS. 4 and 5, it may be seen that mounting block 74 is disposed in housing 12 adjacent first end 18 and thus apertures 48 and 50. It is important that mounting block 74 be positioned so that it, along with prisms 60, 62, mounting blocks 66, 67, mounting plate 68 and wings 72 do not interfere with the light path from apertures 48, 50 to mirrors 52, 54, respectively. Accordingly, mounting block 24 is located between, as well as in front of, apertures 48 and 50. Mounting plate 68 includes an elongated cam arm 84 which extends into motor housing 86 where it contacts a cam 88 located on the shaft of motor 90. A spring 89 holds cam arm 84 against cam 88. Thus, as the shaft of motor 90 rotates, cam 88 acts to reciprocate cam arm 84 in the direction of arrow "A" thus pivoting mounting plate 86 on the axis defined by axial pin 80 and thus slightly pivot each of first and second prisms 60, 62.

Figure 7:
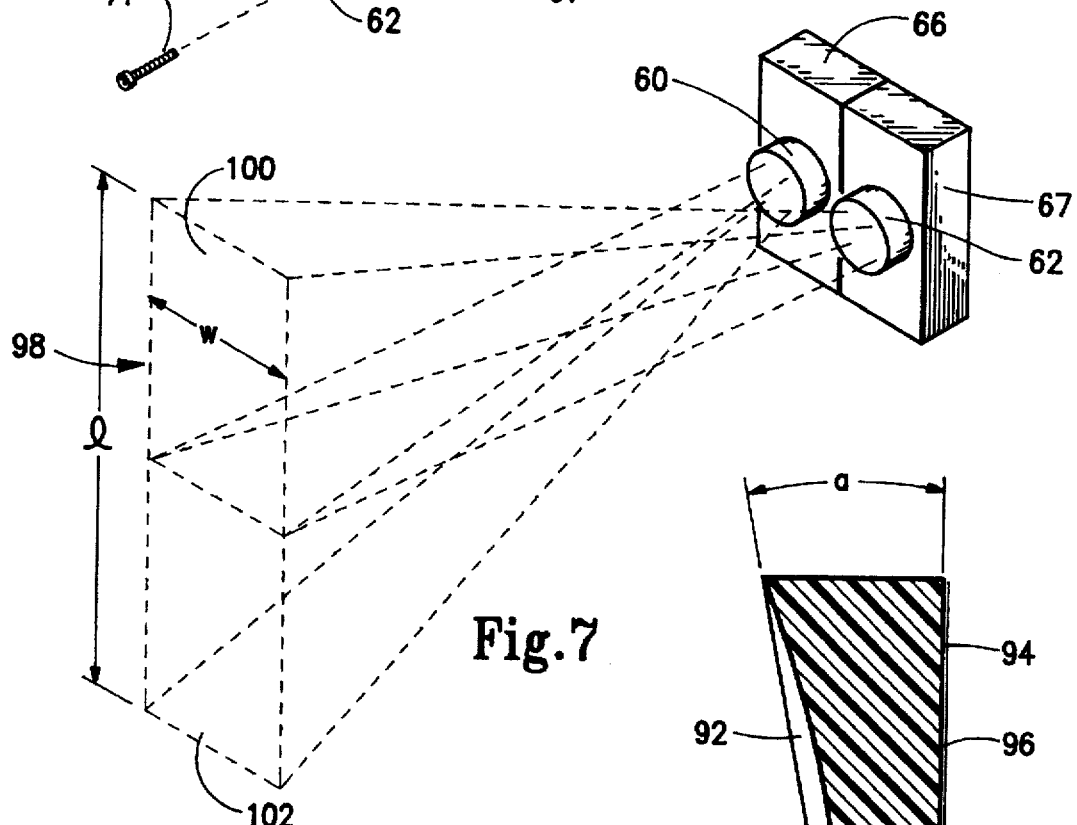
FIG. 7 is a diagrammatic view showing the spectral patterns produced by the dispersing prisms of FIG. 6.
Figure 8:
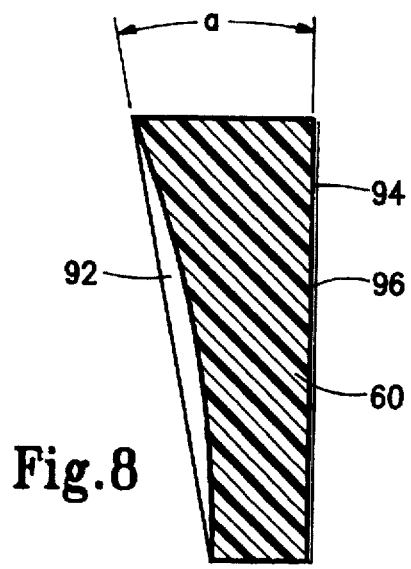
FIG. 8 is a side view in cross-section of a dispersing prism shown in FIGS. 6 and 7.

As may be seen in reference to FIGS. 4, 7 and 8, each of prisms 60 and 62 varying in thickness and care cut with a concave front surface and a convex rear surface. The front surface 92 preferably is formed at a radius of curvature of about 87 millimeters, and the rear surface 94 is formed at a radius of curvature of about 143 millimeters. This focuses the image at about ten centimeters. As is shown in FIG. 8, a front surface 92 angularly diverges from rear surface 94 of representative prism 60 at an angle "a" which is preferably 21°. Since prism 60 interacts with light in the visible spectrum and near infrared, it is preferred that it be formed of SF-6 glass. Conversely, since prism 62 interacts with ultraviolet light, it is preferably formed of fused silica. However, it is to be understood that prisms 60 and 62 are identical in shape. Moreover, each of prisms 60, 62 is provided with a reflective backing layer 96 so that light entering each prism is reflected and dispersed over a selected spectral band.

Turning to FIG. 7, it may be seen that prisms 60 and 62 are oriented so that their respective spectral bands 100, 102 are longitudinally aligned to form a spectral pattern 98 having a longitudinally length "l" and a transverse width "w". Spectral pattern 98 has the width "w" due to the astigmatism of prisms 60 and 62, and it should be understood that they are arranged so as to be as closely adjacent to one another as possible without significant overlap. Turning again to FIG. 4, it may now be appreciated that rotation of cam 88 causes the pivoting of prisms 60 and 62 such that spectral pattern 98 is swept longitudinally in the direction of arrow "B". With the above described configuration of prisms, each of the spectral bands 100, 102 is about five millimeters in the longitudinal direction.

Transversely interposed in spectral path 98 at the focal length of prisms 60 and 62 is a fiber optic beam splitter 104 best shown in FIGS. 9, 10, 11(a) and 11(b). With reference to these figures, it may be seen that fiber optic beam splitter 104 includes a pickup block 106 which mounts first end portions 108 of a plurality of fiber optic strands 110. Fiber optic strands 110 are separated into a first bundle 112 and a second bundle 114 with the second end portions 109 of fiber optic strands 110 of each such bundle being respectively collimated by collimating blocks 116 and 118, respectively. As is shown in FIG. 10, the fiber optic strands in first bundle 112 have first ends 120 while the fiber optic strands in second bundle 114 have first ends 122 with ends 120, 122 being arranged in a single row 124 that defines a fiber optic pickup for light from prisms 60 and 62. This pickup as formed by first end 120, 122 has a length "x" as measured by the sum of the diameter of the accumulated first ends 120, 122, and the pickup has a width "y" that is equal to a single diameter of one of the fiber optic strands. Preferably, the length "x" is approximately 5 millimeters while width "y" is approximately one hundred microns. Moreover, it may be seen in FIG. 10 that there are approximately twice as many ends 120 as there are ends 122. Nonetheless, these strands are uniformly dispersed across the length "x" of row 124 so that there are two ends 120 between adjacent ends 122.

Since the spectra band 100 emitted by the deuterium lamp 40 extends over a wavelength range of approximately 200 to 400 nanometers, the average bandwidth for the test component and reference component as received by the fiber optic pickup is about five nanometers. This is obtained by multiplying the range of the emission spectrum (200 nm) by the size of the pickup (100 microns) and dividing by the physical size, i.e. longitudinal length, of the spectral band (5 mm). It should be understood, however, that the spectral band is non-linear so that the bandwidth actual varies over a range of about 1 to 15 nanometers. In any event, it is preferred that the physical size of the spectral band and the size of the pickup by tuned so that the selected bandwidth is less than twenty nanometers.

This tuning process is a function, then, of the distance between the pickup and the prisms 60, 62, the curvature of surfaces 92, 94 and the diameter of the fiber optic strands 110. If a pickup having a width "y" greater than one hundred microns is desired, then the optics must be changed to increase the longitudinal length of the spectral band. While this could be attained by moving the prisms 60, 62 and the pickup further apart, the image would be out of focus. Thus, it is more advantageous to either change the curvature of surfaces 92, 94 or to change the angle "a" between them. When this is done, the pickup should still be placed at the focal length of the prisms.

With reference to FIGS. 11(a) and 11(b), it may be seen that the second end portions 109 of the fiber optic strands in bundle 112 terminate in second ends 126 with end portions 109 being collimated into a circular cross-section by collimating block 116. Similarly, second end portions 109 of the fiber optic strands in bundle 114 terminate as second ends 128 with end portions 109 being collimated into a circular cross-section by means of collimating block 118. In the above described manner, fiber optic beam splitter 104 acts to split light from the pickup defined by row 124 into a test component carried by first fiber optic bundle 112 and a reference component carried by the fiber optic strands in second fiber optic bundle 114.

Figure 12:
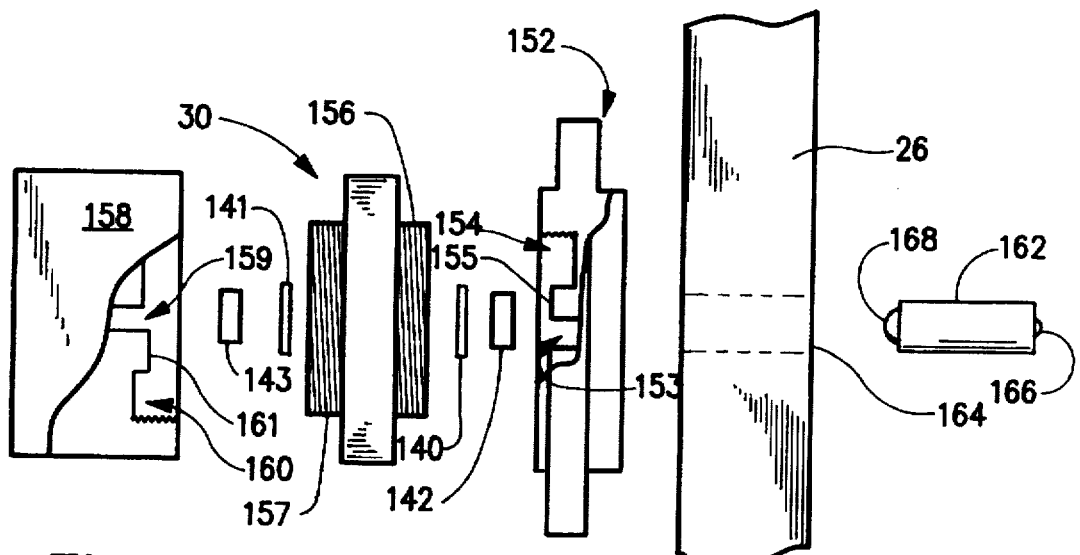
FIG. 12 is an exploded, side view in elevation showing the sample cell mounting structure along with the focusing lens therefor used in the exemplary embodiments of the present invention.
Figure 13:
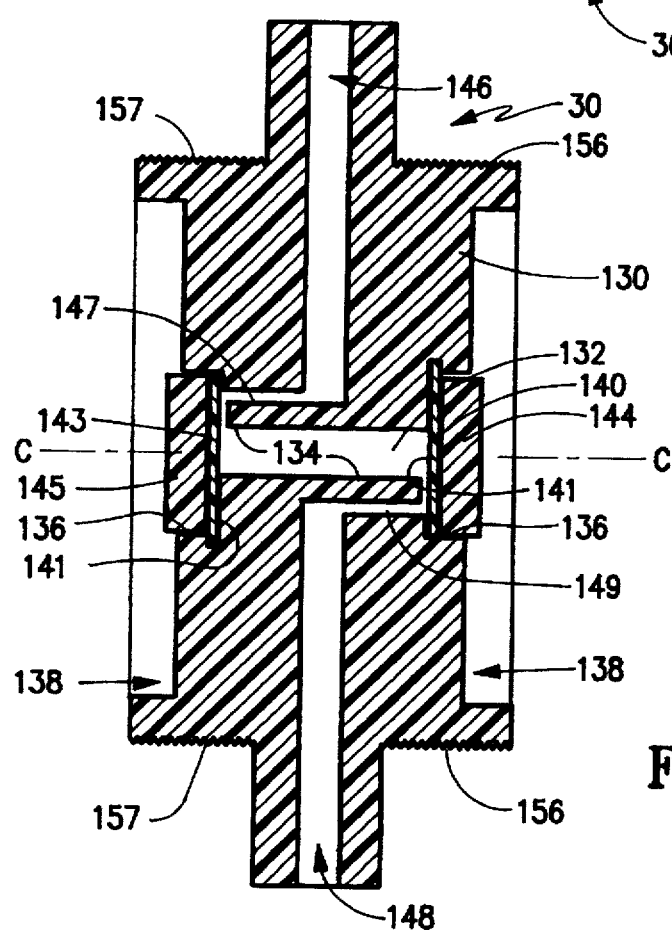
FIG. 13 is a side view in cross-section showing the assembled sample cell of FIG. 12.

It should be understood in reference to FIG. 1, that the reference component of light carried by second fiber optic bundle 114 is presented to second photodetector 44 to provide a reference signal. However, with reference to FIGS. 1 and 4, it should be understood that the test component of light is passed through sample cell 30 and thus through the sample material contained therein. The structure of sample cell 30 and its associated components is best shown in FIGS. 12 and 13 where it may be seen that sample cell 30 has a cylindrical main body 130 that has an axial bore 132 oriented along central axis "C". Bore 132 has a cylindrical surrounding sidewall 134 which forms a chamber for the sample material through which the test component of light is passed. A pair of enlarged seats 136 are axially aligned with one another at opposite ends of bore 132 and their are located within recesses 138, also axially aligned with one another, formed in main body 130. First and second gaskets 140, 142 and first and second transparent windows 144, 145 are seated against seats 136 and thus enclose bore 132 to complete the enclosed chamber for the sample cell. Gaskets 140, 142 have axial holes 141, 143 therethrough to permit passage of light.

In order to introduce a test material into the chamber formed by surrounding sidewall 134, gaskets 140 and windows 142, a pair of radial bores 146 and 148 are formed in main body 130 and respectively form an inlet and outlet for sample cell 30. To this end, radial bore 146 communicates with bore 132 by means of inlet passageway 147 at the second end of bore 146 adjacent second window 145. Similarly, outlet radial bore 148 communicates with a first end of bore 132 adjacent first window 144 by means of an outlet passageway 149. Thus, a fluid sample material may flow through inlet 146, and through passageway 147 after which it flows axially through the sample cell, that is, bore 132. Thereafter, the fluid may exit bore 132 by flowing through passageway 149 and outlet bore 148. Inlet conduit 31 may be connected to inlet bore 146, and an outlet conduit 32 may be connected to outlet bore 148, as is shown in FIG. 1. With reference to FIG. 12, it may be seen that sample cell 30 is mounted to second end plate 26 by means of an interface plate 152 which has a threaded opening 154 adapted to meet with threads 156 on main body 130. Interface plate 152 has an axial passageway 153 to allow light transmission, and a raised area 155 in opening 154 is provided to abut first window 142 in order to seal it against gasket 140. An interface block 158 includes a threaded opening 160 adapted to meet with threads 157 also on main body 130 of sample cell 30. Interface block 158 has an axial passageway 159 to allow light transmission, and a raised area 161 in opening 160 is provided to abut second window 143 in order to seal it against gasket 141. Photodetector 32, in the form of a photocell is then positioned on interface block 158, as is shown in FIG. 1. Electrical signals from detectors 32 and 34 are carried by wires 33 and 35, respectively.

Figure 14:
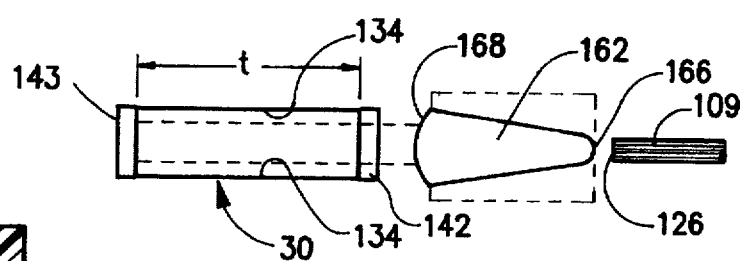
FIG. 14 is a diagrammatic view showing the focusing lens and sample cell configuration of FIGS. 12 and 13.

With reference to FIGS. 12 and 14, it may also be seen that an important feature of the present invention is to have a sample cell of length "t" that is at least one centimeter and to include a lens 162 sized and adapted to fit within a bore 164 formed in second end plate 126 so that lens 162 is axially aligned with central axis "C". Lens 162 has a first end 166 that is in closely-spaced facing relation with second ends 126 of the collimated end portions 109 of the fiber optic strands 110 that comprise first bundle 112. Lens 162 has a second end 168 which is closely-spaced facing relation to first window 142 associated with sample 30. The test component of light emerging from ends 126 preferably has a cone angle less than 25°. Lens 162 is preferably formed of fused silica and is constructed of a length to sufficiently focus the test component at a small cone angle so that, for the length of sample cell 30, the test component does not significantly impinge on the surrounding sidewall 134. This diminishing should accomplish such focusing over all wavelengths in the spectral pattern. Preferably, lens 162 is approximately 12 millimeters in thickness between first end 166 and second end 168 and has an entry diameter of approximately 1.5 millimeter and an exit diameter of approximately 4 millimeter. The radius of curvature at first end 162 is approximately 1 millimeter while the radius of curvature at end 168 is approximately 3 millimeters. In order to make sure that the reference component is also accurate, it should be understood that a lens similar to lens 162 may be interposed between ends 128 of fiber optic portions 109 of the fiber optic strands in second bundle 114 and the photodetector 34.

From the foregoing, and with reference now to FIG. 15, operation of the device may be appreciated in greater detail. In FIG. 15, it may be seen that fluid test material from a test material source 170 is pumped through sample cell 30 by means of a pump 172 connected to inlet conduit 142, with the sample material returning to the test material source by way of outlet conduit 150. Light from light source 20 is incident on a prism, such as representative prism 174 where it is dispersed as a beam 176 over the spectral band of the light source. Prism 174 is drive by means of motor 190 and armature 178 so that fiber optic beam splitter 104 receives a selected narrow bandwidth of beam 176 and splits light from beam 176 into a test component 180 and a reference component 182. Test component 180 is then passed through sample cell 30 where is detected by first photocell detector 32 while reference component 182 is detected by second photocell detector 34. Signals from photocell detectors 32 and 34 are presented to a comparator 184 which then generates a signal, at 186, which may be processed by processor 188 so that the absorption of the sample and sample cell 30 at the selected wavelength bandwidth is displayed on display 190. Display 190 may, for example, be a pen plotter so that a graph of intensity versus wavelength may be automatically written. Processor 188 also controls motor 90 to instruct motor 90 to rotate prism 174 as desired and monitors the position of prism 174 by any convenient means known in the art.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A spectrophotometer apparatus adapted to measure optical absorption properties of a sample material, comprising:

(a) a light source operative to produce light over a selected wavelength spectrum;

(b) an array of optical elements operative to receive a portion of the light from said light source and to disperse said portion as a spectral pattern having a transverse width and varying in wavelength along a longitudinal length, said optical elements including a dispersing prism disposed on a pivotal mount and operative to produce the spectral pattern;

(c) a fiber optic beam splitter including a plurality of fiber optic strands, said fiber optic strands having first ends disposed in a single row and positioned transversely relative to the spectral pattern whereby said first ends form a pickup for receiving light at a selected wavelength in the spectral pattern with said pickup having a length measured across all of the first ends in a transverse direction relative to the spectral pattern and a width as measured diametrically across one of the first ends in a longitudinal direction relative to the spectral pattern, said fiber optic strands being separated into first and second collimated bundles each terminating in second ends opposite respective first ends thereof with the second ends of each of said first and second collimated bundles being arranged to have a circular cross-section whereby said first collimated bundle transmits a test component of light and said second collimated bundle transmits a reference component of light and wherein a majority of said fiber optic strands form said first bundle and wherein a minority of said fiber optic strands form said second bundle, said prism having an orientation relative to said pickup such that said prism projects the spectral pattern onto said pickup with said pickup being oriented transversely thereto said pivotal mount operative to permit selected pivotal movement of said mount such that the longitudinal length of the spectral pattern may be selectively swept across said pickup whereby said pickup can select different wavelengths of light;

(d) a sample cell adapted to receive a sample of material to be tested, said sample cell disposed such that the test component of light is transmitted therethrough;

(e) a first detector adapted to measure intensity of light and disposed to receive the test component of light after the test component has passed through said sample cell, said first detector operative to produce a first signal corresponding to the intensity of light of the test component; and (f) a second detector adapted to measure intensity of light and disposed to receive the reference component of light, said second detector operative to produce a second signal corresponding to the intensity of light of the reference component.

2. A spectrophotometer apparatus according to claim 1 including a signal comparator operative to compare the first and second signals and to produce output correlated to an amount of light absorbed by the sample material at the selected wavelength.

3. A spectrophotometer apparatus according to claim 1 including an automated drive operative to reciprocally pivot said mount thereby to sweep the spectral pattern across said pickup.

4. A spectrophotometer apparatus according to claim 1 wherein the width of said pickup is about one hundred microns.

5. A spectrophotometer apparatus according to claim 1 wherein the length of said pickup is about five millimeters.

6. A spectrophotometer apparatus according to claim 1 wherein the first ends of said fiber optic strands in said second bundle being equidistantly spaced from one another across the length of said pickup with respective ones of the first ends of said fiber optic strands in said first bundle being interposed between adjacent ones of the first ends of said fiber optic strands in said second bundle.

7. A spectrophotometer apparatus according to claim 6 wherein said fiber optic strands in said first bundle and said fiber optic strands in said second bundle are in a ratio of 2:1.

8. A spectrophotometer apparatus according to claim 1 wherein said pickup has a selected width and wherein said optical elements are arranged and oriented with respect to said pickup such that said pickup selects light in the spectral pattern at a bandwidth of less than twenty nanometers.

9. A spectrophotometer apparatus according to claim 1 wherein said sample cell is formed as a chamber having a central axis, a surrounding sidewall and a pair of axially opposed windows whereby the test component of light may be passed axially through the chamber in a direction from a first window to a second window, and including a lens interposed between the second ends of said fiber optic strands in said first bundle and the first window, said lens constructed to focus the test component of light so that the test component of light does not significantly impinge on the surrounding sidewall as the test component of light passes through said sample cell.

10. A spectrophotometer apparatus according to claim 9 wherein the chamber is cylindrical in shape, second end portions of said fiber optic strands adjacent the second ends in said first bundle being axially aligned with the central axis of the chamber.

11. A spectrophotometer apparatus according to claim 9 wherein said sample cell includes an inlet and an outlet each in fluid communication with the chamber whereby a fluid test sample may flow through the chamber.

12. A spectrophotometer apparatus according to claim 9 wherein said first and second detectors are first and second photocells, respectively, said first photocell being positioned proximately to said second window.

13. A spectrophotometer apparatus adapted to measure optical absorption properties of a sample material, comprising:

(a) a housing having an interior;

(b) a support block secured to said housing in the interior thereof and located proximate to a first end of said housing;

(c) a mounting plate pivotally connected to said mounting block for reciprocal pivotal motion relative thereto about a pivot axis;

(d) first and second reflecting prisms secured to said mounting plate and facing a second end of said housing opposite the first end thereof;

(e) a first light source operative to produce light over a first spectrum and having a first aperture located proximate to said support block;

(f) a second light source operative to produce light over a second spectrum different from said first spectrum and having a second aperture located proximate to said support block;

(g) a first concave mirror having a first focal length, said first concave mirror disposed in said housing in facing relationship to the first aperture and spaced therefrom a distance equivalent to the first focal length thereby to reflect light from said first light source in a first beam onto said first reflecting prism, said first reflecting prism operative to reflect and disperse said first beam as a first spectral band varying in wavelength in a longitudinal direction;

(h) a second concave mirror having a second focal length, said second concave mirror disposed in said housing in facing relationship to the second aperture and spaced therefrom a distance equivalent to the second focal length thereby to reflect light from said second light source as a second beam onto said second reflecting prism, said second reflecting prism operative to disperse said second beam as a second spectral band varying in wavelength in a longitudinal direction, said first and second reflecting prisms oriented such that said first and second spectral bands are longitudinally aligned with one another as a spectral pattern;

(i) a fiber optic beam splitter including a plurality of fiber optic strands, said fiber optic strands having first ends disposed in a row and positioned transversely relative to the spectral pattern whereby said first ends form a pickup for receiving light at a selected wavelength in the spectral pattern with said pickup having a length measured in a transverse direction relative to the spectral pattern, said fiber optic strands being separated into first and second collimated bundles each terminating in second ends opposite respective first ends thereof with the second ends of each of said first and second collimated bundles being arranged to have a circular cross-section whereby said first collimated bundle transmits a test component of light and said second collimated bundle transmits a reference component of light;

(j) a motor linked to said mounting plate and operative to reciprocally move said mounting plate and thereby said first and second reflecting prisms whereby the spectral pattern is longitudinally swept across said pickup;

(k) a sample cell having first and second opposed windows axially spaced from one another along a central axis and having a surrounding sidewall thereby to form a chamber adapted to receive a sample of material to be tested, said first widow facing the first ends of said first collimated bundle and axially aligned therewith;

(l) a lens interposed between the first ends of said collimated bundle and said first window, said lens constructed to focus the test component of light so that the test component of light does not significantly impinge on the surrounding sidewall as the test component of light passes through said sample cell.

(m) a first detector adapted to measure intensity of light and disposed to receive the test component of light after the test component has passed through said sample cell, said first detector operative to produce a first signal corresponding to the intensity of light of the test component;

(n) a second detector adapted to measure intensity of light and disposed to receive the reference component of light, said second detector operative to produce a second signal corresponding to the intensity of light of the reference component; and (o) a signal comparator operative to compare the first and second signals and to produce output correlated to an amount of light absorbed by the sample material at the selected wavelength.

* * * * *